(12) United States Patent
Zollner et al.

(10) Patent No.: US 8,467,947 B2
(45) Date of Patent: Jun. 18, 2013

(54) METHOD OF OPERATING AN AUXILIARY ELECTRIC PUMP

(75) Inventors: Tobias Zollner, Lindau (DE); Bernd Allgaier, Kressbronn (DE); Christian Schwemer, Sigmarszell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 340 days.

(21) Appl. No.: 12/959,713

(22) Filed: Dec. 3, 2010

(65) Prior Publication Data

US 2011/0144846 A1 Jun. 16, 2011

(30) Foreign Application Priority Data

Dec. 16, 2009 (DE) .......................... 10 2009 054 754

(51) Int. Cl.
*G06F 7/00* (2006.01)
*G06F 17/00* (2006.01)
*G06F 19/00* (2011.01)

(52) U.S. Cl.
USPC ..... 701/66; 701/51; 180/65.265; 180/65.275; 903/904; 903/914; 903/915; 903/930; 477/34; 477/156; 477/157

(58) Field of Classification Search
USPC .................. 701/22, 51, 53, 54, 60; 180/65.1, 180/65.21, 65.22, 65.265, 65.275; 477/3, 477/7, 15, 16, 20, 34, 51, 156–164; 137/625, 137/625.65, 625.23, 625.68, 625.28; 903/902, 903/904, 909, 914, 915, 930, 945
See application file for complete search history.

(56) References Cited

U.S. PATENT DOCUMENTS

| | | | | |
|---|---|---|---|---|
| 4,514,147 A * | 4/1985 | Borman et al. | ............... | 417/288 |
| 5,944,632 A * | 8/1999 | Hara et al. | ..................... | 477/158 |
| 6,799,109 B2 * | 9/2004 | Nakamori et al. | .............. | 701/54 |
| 6,805,647 B2 * | 10/2004 | Silveri et al. | ...................... | 475/4 |
| 7,041,030 B2 * | 5/2006 | Kuroda et al. | ................... | 477/21 |
| 8,057,355 B2 * | 11/2011 | Tryon et al. | ..................... | 477/52 |
| 2003/0171867 A1 * | 9/2003 | Nakamori et al. | .............. | 701/54 |
| 2007/0240776 A1 * | 10/2007 | Mizui | ..................... | 137/625.69 |
| 2009/0105918 A1 * | 4/2009 | Kobayashi et al. | ............. | 701/67 |
| 2009/0247353 A1 | 10/2009 | Tryon et al. | | |
| 2010/0191402 A1 * | 7/2010 | Aldrich et al. | .................. | 701/29 |
| 2010/0216597 A1 | 8/2010 | Grundler et al. | | |

FOREIGN PATENT DOCUMENTS

DE 10 2009 014 593 A1 11/2009
DE 10 2009 001 110 A1 8/2010

* cited by examiner

*Primary Examiner* — Thomas H. Tarcza
*Assistant Examiner* — Rami Khatib
(74) *Attorney, Agent, or Firm* — Davis & Bujold, PLLC

(57) ABSTRACT

A method for operating a hydraulic system of an automatic transmission, in particular in a hybrid drivetrain, in which the hydraulic system comprises a main pump that is powered by an internal combustion engine and/or an electric drive motor, an electric auxiliary pump and a system pressure valve for setting a system pressure, to ensure various operating functions. In addition to the main pump, the electric auxiliary pump also supplies the hydraulic system with a volume flow of an operating medium. The loading of the electric auxiliary pump is determined in an electronic control unit with regard to the value of the system pressure and the loading of the electric auxiliary pump is limited, by the electronic control unit, with regard to the selected operating function.

14 Claims, 2 Drawing Sheets

METHOD OF OPERATING AN AUXILIARY ELECTRIC PUMP

This application claims priority from German patent application serial no. 10 2009 054 754.1 filed Dec. 16, 2009.

FIELD OF THE INVENTION

The invention concerns a method for operating a hydraulic system of an automatic transmission, in particular in a hybrid drivetrain.

BACKGROUND OF THE INVENTION

In automatic transmissions the shifting of the various gear ratio steps generally takes place by hydraulic pressurization of shift elements such as clutches or brakes. The shift elements, together with an oil supply system, form a hydraulic system. To change the gear ratio, certain shift elements in the hydraulic system are relieved from hydraulic pressure and other shift elements are filled with an operating medium and acted upon by a hydraulic pressure. Since the gear ratio change has to be completed within a finite, limited time, the filling of the shift elements must take place correspondingly quickly, and this entails producing a high volume flow in the hydraulic system. The volume flow is produced by a pump of the oil supply system, as is the hydraulic pressure for pressurizing the shift elements. For this purpose as a rule only one pump is provided in an automatic transmission, in most cases in the form of a displacement pump with a fixed displacement volume. The displacement pump is usually a gearwheel pump, preferably an internal gearwheel pump because of its more compact structure. The pump rotates in proportion to the input speed of the transmission, so the volume flow delivered by the pump increases linearly with the input speed. The function of the volume flow with input speed, is also called the delivery characteristic in what follows. Conventionally, the displacement volume of the pump is chosen such that the oil demand of the hydraulic system can be covered at all rotation speeds and to ensure all operating functions. Such operating functions are for example the engagement of a gear ratio step or a shift process for changing gear ratios, with the brief demand for a high volume flow described. This peak demand must be covered by the delivery characteristic of the pump, and consequently, other than during the operating functions, the volume flow delivered exceeds the needs of the automatic transmission and thus, in combination with the pressure produced, constitutes an energy loss with corresponding adverse impacts on the efficiency of the hydraulic system and the transmission.

In one possible solution of this problem, the displacement volume of the pump is made so small that only the demand during steady-state operation of the automatic transmission, i.e. not during gear ratio changes, is covered. With this comparatively small volume flow the automatic transmission is lubricated and cooled, and any leakage losses in the hydraulic system are made up. The momentary peak demand is covered for a limited time by an auxiliary pump. The auxiliary pump is preferably driven by an electric motor, since this can be switched on or off according to need. In a conventional automatic transmission the motor is an auxiliary electric motor. If the automatic transmission forms part of a hybrid drivetrain in which an electric machine acting as a motor is also arranged, then the auxiliary pump can be driven by the machine.

To keep down the construction effort and costs, the auxiliary electric pump is not designed for the maximum peak pressures that occur in the hydraulic system. This can relate to both the design of the auxiliary pump and the size of the electric motor. To avoid overloading due to a system pressure that is too high, according to the prior art a pressure line of the electric auxiliary pump is connected via a pressure-relief valve to its suction line or to the transmission sump. The pressure-relief valve is set to open as soon as the system pressure exceeds a still acceptable pressure limit value. In this way the pressure acting on the electrical auxiliary pump is limited and overload thereof is avoided.

The disadvantages of this solution are the structural space required in the transmission for fitting the pressure-relief valve in the hydraulic system, the additional components and the costs for the pressure-relief valve.

SUMMARY OF THE INVENTION

The purpose of the present invention is to avoid overloading the electric auxiliary pump by a simple means. In particular, no additional components should be needed for this.

A hydraulic system of an automatic transmission, in particular for a hybrid drive, comprises a main pump driven by an internal combustion engine and/or an electric drive motor, an electric auxiliary pump and a system pressure valve. The system pressure valve serves to set a system pressure. The electric auxiliary pump comprises a pump and an electric motor, and to ensure various operation functions it supplies the hydraulic system with a volume flow of an operating medium in addition to the main pump. According to the invention the loading of the electric auxiliary pump is determined by virtue of a system pressure value in an electronic control unit, the loading of the electric auxiliary pump being limited by the electronic control unit with regard to the operating function selected.

This has the advantage that limiting of the load of the electric auxiliary pump takes place by virtue of existing elements so that, compared with the prior art, a pressure-relief valve and the associated structural space requirement and costs can be omitted. Furthermore, the loading of the electric auxiliary pump can be varied to suit the situation.

In one version of the invention the value of the system pressure is calculated by the electronic control unit with reference to a characteristic curve stored therein, such that in the characteristic an electric current value required for controlling the system pressure valve and a value of the system pressure set by the current value are associated with one another. As a further possibility, the current value and the system pressure value can be related to one another by a mathematical function, so that the system pressure in each case can be calculated from the value of the current.

Alternatively, it can be provided that the value of the system pressure is measured by a pressure sensor. Preferably, the pressure sensor can be arranged in a consumer line between the system pressure valve and a consumer. The disadvantage of the additional pressure sensor required is counterbalanced by the advantage of direct system pressure measurement.

In a possible embodiment, the operating function selected by means of an input unit is registered in the electric control unit and a system pressure calculated therein or determined by the pressure sensor is compared in the electronic control unit with a defined pressure limit value stored therein. In combination with an infinite loading duration, the defined pressure limit value indicates the maximum acceptable loading of the electric auxiliary pump.

In a preferred embodiment variant of the invention, it can be provided that to limit the loading of the electric auxiliary pump, by operating the system pressure valve the electronic control unit limits the system pressure acting upon the electric auxiliary pump to, or to below the defined pressure limit value. The lowering of the pressure by means of the present system pressure valve makes it unnecessary to use a pressure-relief valve in addition.

Furthermore, to limit the loading of the electric auxiliary pump the electronic control unit can limit the time for which the electric auxiliary pump is switched on and hence the time for which it is loaded. In this way it is advantageously possible for the electric auxiliary pump to build up a system pressure higher than the defined pressure limit value for a short time, if this is required by the operating function concerned. The switch-on duration is chosen taking into account the value of the system pressure.

Moreover, it is possible to limit both the switch-on duration of the electric auxiliary pump and the system pressure, this depending on the operating function selected.

Furthermore, it can be provided that for a first operating function in which, to engage a gear, at least one hydraulic actuating element has to be filled in a limited time by a system pressure whose value is higher than the defined pressure limit value, the electric auxiliary pump is only switched on by the electronic control unit when the electronic control unit has set the system pressure to below or at the defined pressure limit value by operating the system pressure valve.

According to a further development of the invention it can be provided that during a first operating function the electronic control unit switches off the electric auxiliary pump if the system pressure rises above the defined pressure limit value because of a frictional defect in the control of the system pressure valve. Thus, in contrast to the prior art, a defect situation can be recognized by detecting the system pressure, and switching the electric auxiliary pump on can be prevented.

A further version of the method provides that for a second operating function in which at least one hydraulic shift element is filled during a gearshift, the electronic control unit switches on the electric auxiliary pump regardless of the level of the system pressure. If during this the value of the system pressure is higher than the defined pressure limit value, then to limit loading of the electric auxiliary pump the electronic control unit limits the switched-on duration of the pump. In contrast to the pressure-relief valve that characterizes the prior art, a situation-dependent boost of the system pressure is possible in order to perform an operating function while at the same time avoiding an overload of the electric auxiliary pump. With a pressure-relief valve according to the prior art it would not be possible to perform the second operating function, since the opening pressure of the pressure-relief valve is approximately constant and which operating function has been chosen cannot therefore be taken into account.

In this connection a further embodiment provides that loading of the electric auxiliary pump is described by a loading characteristic which involves the system pressure and the switched-on duration of the electric auxiliary pump. Furthermore, in the electronic control unit the permissible switched-on duration of the electric auxiliary pump is calculated from a permissible maximum value of the loading characteristic stored therein and from the value of the system pressure calculated in the electronic control unit or measured by means of the pressure sensor.

Alternatively, for the second operating function, the permissible switched-on duration of the electric auxiliary pump can be determined in the electronic control unit from a characteristic curve stored therein, in which a maximum switched-on duration is associated with the value of the system pressure. This advantageously makes it possible, depending on the requirements of the various operating functions, to increase the level of the system pressure with an adapted switched-on duration.

In a preferred embodiment variant of the invention it can be provided that the selected operating function is communicated to the electronic control unit by means of an input unit via a signal line. The electronic control unit can operate the system pressure valve via a first control line and the electric motor of the electric auxiliary pump via a second control line. If the system pressure is measured directly by a pressure sensor, the sensor's signal is passed to the electronic control unit via a further signal line and registered therein.

In this connection, one design provides a device such that a pressure sensor is connected to an electronic control unit via a first signal line and an input unit via a second signal line. In addition, to operate a system pressure valve the electronic control unit is connected thereto by a first control line and to operate an electric motor it is connected thereto by a second control line. In a particularly advantageous embodiment a hydraulic system of an automatic transmission comprises the device described in a hybrid drivetrain and is operated in accordance with the method described.

BRIEF DESCRIPTION OF THE DRAWINGS

Example embodiments of the invention are represented in the drawings and are described in detail below.

The drawings show.

DETAILED DESCRIPTION OF THE PREFERRED EMBODIMENTS

Figure 1:
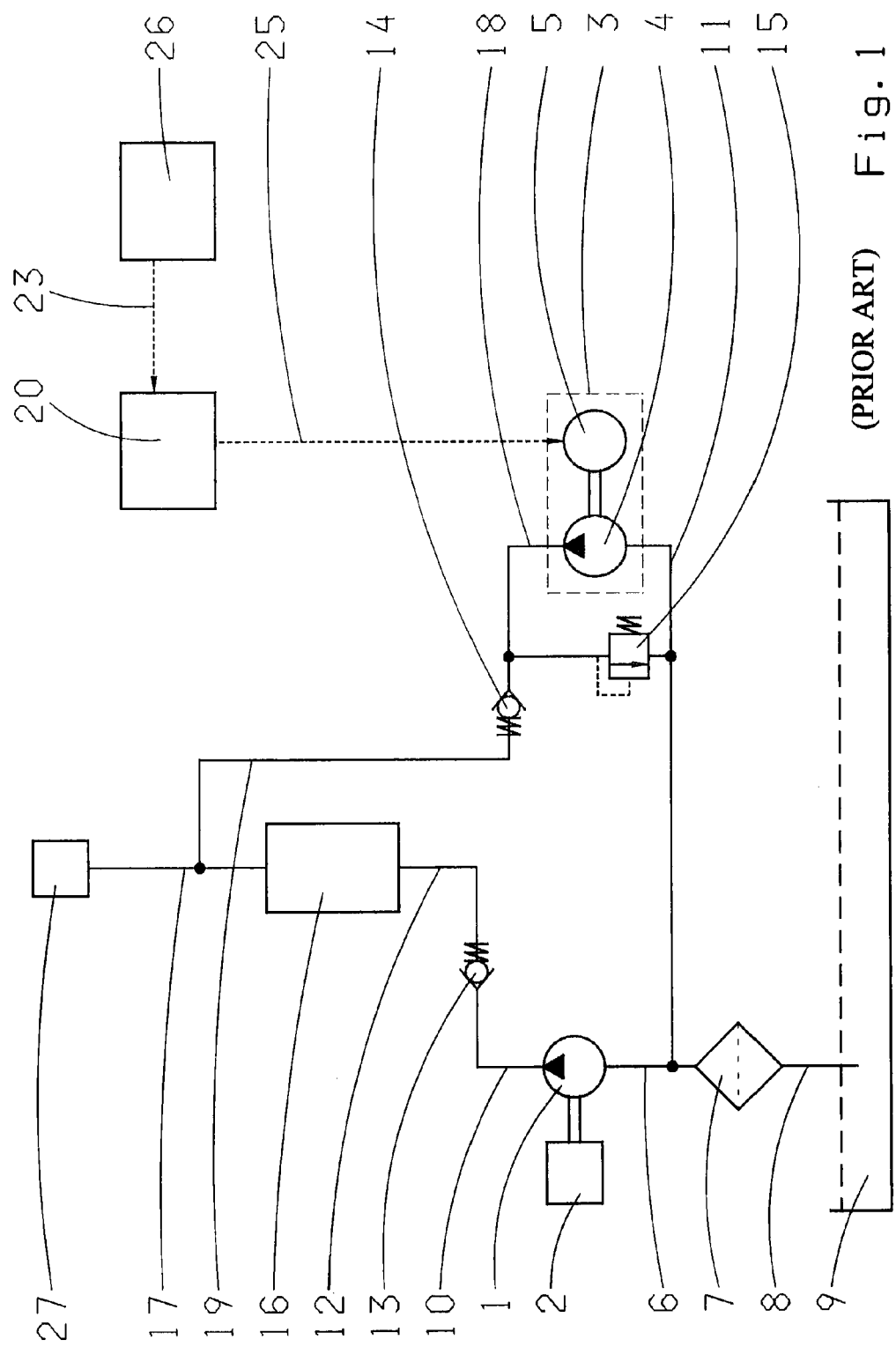
FIG. 1: Schematic representation of a hydraulic system of the prior art.

FIG. 1 shows a hydraulic system of an automatic transmission according to the prior art. The hydraulic system comprises a main pump 1 and an electric auxiliary pump 3. The main pump 1 is driven mechanically by an internal combustion engine 2, which serves to drive the vehicle. Alternatively an electric motor would also be conceivable for driving the vehicle, or a combination of both types of motor. The main pump 1 can be in the form of a displacement pump, in particular a gearwheel pump. Of the possible design forms of a gearwheel pump as an inner or outer gearwheel pump, in an automatic transmission the use of an inner gearwheel pump is preferred because of its compact structure. The electric auxiliary pump 3 comprises a pump 4 and an electric motor 5 that drives it, the pump 4 also preferably being in the form of a displacement pump.

The main pump 1 draws up an operating medium stored in the transmission sump 9, preferably oil, through a suction line 6, a filter 7 and a suction line 8, and delivers it through a pressure line 10, a one-way valve 13, a pressure line 18 and a system pressure valve 16 to a consumer line 17 and thence to a consumer 27. The consumer 27 is a shift element or a group of shift elements preferably in the form of hydraulically actuated clutches or brakes. In this example the shift elements serve for shifting the various gear ratio steps of the automatic transmission. The system pressure valve here sets a system pressure p_sys in the consumer line 17 and hence the consumer 27, which can vary depending on the level of the drive torque to be transmitted.

The electric auxiliary pump 3 is only operated when the main pump 1 can no longer cover the demand of the automatic transmission for a volume flow of the operating medium. The value of the demand for addition volume flow is taken from a leakage model stored in the electronic control unit 20, in which, for example, as a function of the temperature of the operating medium or its pressure, a corresponding volume flow required for performing a particular operating function is determined. Thus, the threshold for switching on the electric auxiliary pump 3 depends on several influencing parameters. The operating function desired is selected in an input unit 26 and communicated to an electronic control unit 20 via a signal line 23. The input unit 26 can be a driving switch, a selector lever or a sensor for the accelerator pedal position. The operating function concerned can be for example an upshift in which, for the rapid filing of a consumer 27, in this case a hydraulic clutch, a higher volume flow of operating medium is needed for a short time. After recognizing the designed operating function, the electronic control unit 20 actuates the electric motor 5 via a control line 25 and switches on the electric auxiliary pump 3. In parallel with the main pump 1, the pump 4 then draws operating medium out of the oil sump 9 through a suction line 11, the filter 7 and the suction line 8, and delivers it via a pressure line 18, a one-way valve 14 and a pressure line 19 to the consumer line 17 and hence to the consumer 27.

The system pressure p_sys acts not only in the consumer 27 and the consumer line 17, but also in the pressure line 19. For an additional volume flow of operating medium to be delivered by the electric auxiliary pump 3 to the consumer 26, the one-way valve 14 must be open. This is only possible when the electric auxiliary pump 3 generates a pressure which is higher than the system pressure p_sys. But if the system pressure p_sys is higher than a pressure limit value defined for the electric auxiliary pump 3, the pressure generated by the electric auxiliary pump 3 would exceed the defined pressure limit value and this can result in damage to the electric auxiliary pump 3. For an infinite loading duration the designed pressure limit value is the maximum pressure permitted to act on the electric auxiliary pump 3 or the maximum permitted loading of the electric auxiliary pump 3.

To avoid overloading the electric auxiliary pump 3, the pressure in the pressure line 18 is limited by a pressure-relief valve 15 to the value of the defined pressure limit value. In this case the pressure-relief valve 15 is located between the pressure line 18 and the suction line 11, and it opens if the defined pressure limit value is exceeded, whereby the operating medium is passed from the pressure line 18 back into the suction line 11. Disadvantageously, the pressure-relief valve 15 itself and the lines and branch connectors required for its arrangement entail additional components and assembly steps and therefore additional costs. Besides, the additional components take up structural space.

Figure 2:
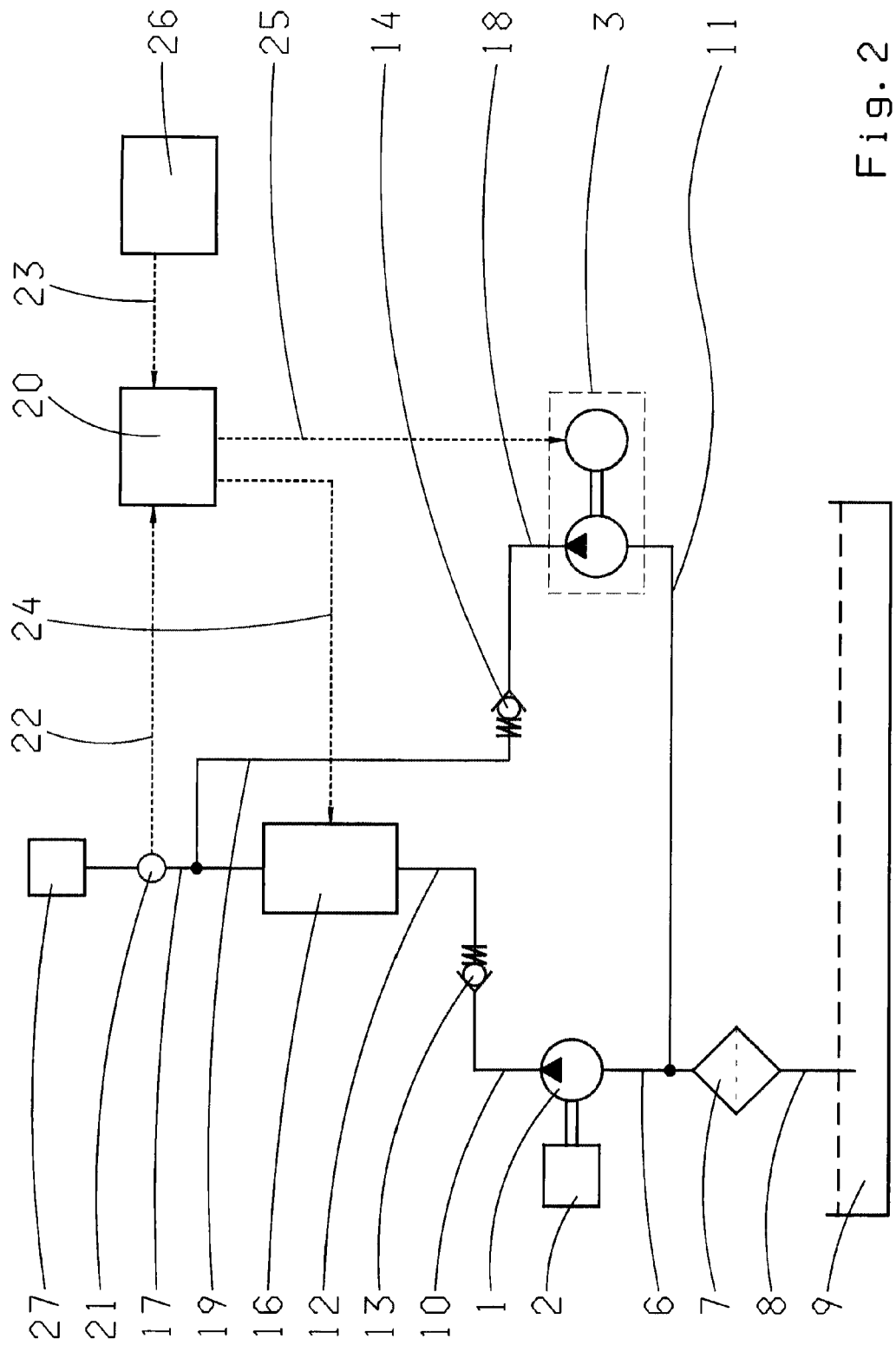
FIG. 2: Schematic representation of a hydraulic system according to the invention

FIG. 2 is a schematic representation of a hydraulic system according to the invention, in which the pressure-relief valve 15 and thus also its connection between the pressure line 18 and the suction line 11 are omitted.

Instead, the loading of the electric auxiliary pump 3 is limited by the electronic control unit 20 in the following manner: the electronic control unit 20 determines the system p_sys, this determination taking place in various ways.

The first possibility for determining the system pressure p_sys is to determine the value of the current sent by the electronic control unit 20 to the system pressure valve 16, by virtue of which the electromagnetically operated system pressure valve 16 sets a given system pressure p_sys. The current value and the system pressure p_sys are in fixed association with one another via a valve characteristic curve, so that if the value of the current acting on the system pressure valve 16 is known, the corresponding value of the system pressure p_sys set is also known. The current value and the system pressure p_sys can also be linked by a mathematical function.

The second possibility for determining the system pressure p_sys is to measure it directly by means of a pressure sensor 21 in the consumer line 17, as shown in FIG. 2. Alternatively, the pressure sensor 21 can also be arranged at the clutch 27 or in the pressure line 19 or, on the consumer side, at the system pressure valve 16. The measurement signal from the pressure sensor 21 is passed via a signal line 22 to the electronic control unit 20 and registered therein. The additional cost of a pressure sensor 21 is in this case offset by the advantage of determining the system pressure p_sys directly.

The electronic control unit 20 recognizes the operating function called for by the input unit 26 via a signal line 23. Via a control line 24 the electronic control unit 20 can operate the system pressure valve 16 and thereby change the system pressure p_sys. Via a control line 25 the electronic control unit 20 can actuate the electric motor 5 of the electric auxiliary pump 3, i.e. turn it on and off. It is also conceivable, if the electric motor 5 is appropriately designed, that in addition to switching it on and off the electronic control unit 20 can vary its speed.

If, to perform the desired operating function, it is now necessary to supply the consumer 27 with an additional volume flow from the electric auxiliary pump 3, the system pressure p_sys determined by one of the two possible methods mentioned above is first examined in the electronic control unit 20 and compared with the defined pressure limit value stored in the electronic control unit 20. After a comparison of the system pressure p_sys, if a volume flow is called for the electric auxiliary pump 3 is always switched on if the value of the system pressure p_sys is lower than or equal to the defined pressure limit value. If the system pressure p_sys is higher than the defined pressure limit value, then depending on the operating function called for, the electronic control unit 20 acts in a different way on the hydraulic system.

For a first operating function recognized by the electronic control unit 20, such as the filling of one or more clutches for the engagement of a gear while an automatic transmission is idling, an additional volume flow at a low system pressure p_sys is needed. If the system pressure p_sys measured is higher than the defined pressure limit value, the electronic control unit 20 first operates the system pressure value 16 via the control line 24 and thereby reduces the system pressure p_sys to, or to below the defined pressure limit value. Until the desired system pressure p_sys has been set, the electric auxiliary pump 3 is separated by the one-way valve 14 from the system pressure p_sys and thereby protected. Only once the system pressure p_sys has fallen does the electronic control unit 20 switch the electric auxiliary pump 3 on via the control line 25 so that the operating medium is delivered into the consumer line 17 and hence to the consumer 27.

If a fault occurs such that for the first operating function selected the system pressure p_sys cannot be reduced to below the defined pressure limit value, then the electric motor 5 is not switched on by the electronic control unit 20.

The loading of the electric auxiliary pump 3 during operation is a superposition of a pressure force acting on the pump 4, in this case the system pressure p_sys, and the action duration of this pressure force on the pump 4 or electric auxiliary pump 3. The action duration, also termed the loading duration, corresponds to the time during which the electric auxiliary pump 3 is switched on. For example, if the loading duration is longer than a certain upper limit, the pressure must not exceed a defined pressure limit value. On the other hand, if the defined pressure limit value is exceeded, then the switched-on duration must be shorter than a critical limit value. To protect the electric auxiliary pump 3 from overload, a loading characteristic composed of the system pressure p_sys and the switched-on duration must not exceed a permitted maximum value.

In the electronic control unit 20 a relationship between the level of the system pressure p_sys and the permitted loading duration is stored in the form of a characteristic line or a table of values. Having regard to the operating function selected and the system pressure p_sys registered in the electronic control unit 20, a permissible loading duration is determined.

As an alternative, the maximum permitted switched-on duration can be calculated in the electronic control unit 20 as a function of the measured system pressure p_sys, having regard to the operating function recognized.

For a second operating function, for example filling and engaging of the clutch 27 during a gearshift, an additional volume flow is needed for a short time and, depending on the level of the torque to be transmitted, the system pressure p_sys can be above the defined pressure limit value. In such a case, when the operating function selected has been recognized the electric auxiliary pump 3 can be switched on despite the fact that the system pressure p_sys is above the limit, although only for a limited time. When the electric motor 5 of the electric auxiliary pump 3 is switched on a time-switch device is started, which switches the electric motor 5 off again when the maximum permitted switched-on duration for the system pressure p_sys concerned is reached. Here, the permitted switched-on duration is chosen such that the resulting load characteristic remains below a critical value, so that despite the brief excess pressure the electric auxiliary pump 3 will sustain no damage.

If the clutch 27 cannot be filled within the permitted switched-on duration, the filling process is prolonged since after the switched-on duration of the electric auxiliary pump 3 has ended, the volume flow for filling has to be delivered by the main pump 1 acting alone. Advantageously, the flow delivered by the electric auxiliary pump 3 should be of a size such that the filling process for the clutch 27 can be completed within the switched-on duration permitted for the system pressure p_sys at the time.

When the electric auxiliary pump 3 is switched off, the system pressure p_sys acts to close the one-way valve 14 so that the electric auxiliary pump 3 can no longer be acted upon by the system pressure p_sys.

INDEXES

1 Main pump
2 Internal combustion engine
3 Electric auxiliary pump
4 Pump
5 Electric motor
6 Suction line
7 Filter
8 Suction line
9 Transmission sump
10 Pressure line
11 Suction line
12 Pressure line
13 One-way valve
14 One-way valve
15 Pressure-relief valve
16 System pressure valve
17 Consumer line
18 Pressure line
19 Pressure line
20 Electronic control unit
21 Pressure sensor
22 Signal line
23 Signal line
24 Control line
25 Control line
26 Input unit
27 Consumer
P_sys System pressure

The invention claimed is:

1. A method of operating a hydraulic system of an automatic transmission in a hybrid drivetrain, the hydraulic system comprises a main pump which is powered by at least one of an internal combustion engine and an electric drive motor, an electric auxiliary pump and a system pressure valve for setting a system pressure, and the electric auxiliary pump, in addition to the main pump, also supplies the hydraulic system with a volume flow of an operating medium to ensure various operating functions, the method comprising the steps of:

determining a duration of loading of the electric auxiliary pump with an electronic control unit based on a value of the system pressure and a selected operating function; and loading the electric auxiliary pump, via the electronic control unit, over the determined duration of loading to adjust the system pressure.

2. The method according to claim 1, further comprising the step of calculating the value of the system pressure with reference to a characteristic curve of a characteristic stored in the electronic control unit such that in the characteristic curve, current values required for controlling the system pressure valve and the values of the system pressure produced by the current values are associated with one another.

3. The method according to claim 1, further comprising the step of measuring the value of the system pressure by a pressure sensor.

4. The method according to claim 1, further comprising the step of registering the selected operating function in the electronic control unit via an input unit and comparing the system pressure in the electronic control unit with a defined pressure limit value stored therein, and the defined pressure limit value in combination with continuous loading of the electric auxiliary pump indicating a maximum permissible loading of the electric auxiliary pump.

5. The method according to claim 1, further comprising the step of limiting, via the electronic control unit, the system pressure acting on the electric auxiliary pump to a value that is equal to or less than a defined pressure limit value, by operating the system pressure valve to limit the loading of the electric auxiliary pump.

6. The method according to claim 1, further comprising the step of limiting, via the electronic control unit, a switched-on duration and hence a loading duration of the electric auxiliary pump to limit the loading of the electric auxiliary pump, the switched-on duration being selected with regard to the value of the system pressure.

7. The method according to claim 1, further comprising the step of ensuring a first operating function, in which to engage a gear at least one hydraulic actuating element has to be filled within a limited time, when the value of the system pressure is higher than a defined pressure limit value, the electric auxiliary pump is only switched on by the electronic control unit when the electronic control unit has adjusted the system pressure to a value that is less than or equal to the defined pressure limit value by operating the system pressure valve.

8. The method according to claim 7, further comprising the step of switching off the electric auxiliary pump with the electronic control unit during the first operating function if, as a result of a fault in controlling the system pressure valve, the system pressure rises above the defined pressure limit value.

9. The method according to claim 7, further comprising the step of ensuring a second operating function in which at least one hydraulic shift element is filled during a gearshift, by switching on the electric auxiliary pump with the electronic control unit regardless of the value of the system pressure, but limiting the switched-on duration if the value of the system pressure is higher than the defined pressure limit value.

10. The method according to claim 9, further comprising the step of delineating the loading of the electric auxiliary pump by a loading characteristic which involves the system pressure and the switched-on duration of the electric auxiliary pump, and calculating during the second operating function the permitted switched-on duration of the electric auxiliary pump in the electronic control unit from a permitted maximum value of the loading characteristic stored therein and from the value of the system pressure registered in the electronic control unit.

11. The method according to claim 9, further comprising the step of determining, during the second operating function, the permitted switched-on duration of the electric auxiliary pump in the electronic control unit from a characteristic curve stored therein, in which the value of the system pressure is associated with a maximum switched-on duration.

12. The method according to claim 1, further comprising the step of communicating the selected operating function by the input unit to the electronic control unit via a signal line, and the electronic control unit controlling the system pressure valve via a first control line and an electric motor of the electric auxiliary pump via a second control line.

13. A device for carrying out a method for operating a hydraulic system of an automatic transmission, in a hybrid drivetrain, the device comprises a main pump powered by at least one of an internal combustion engine and an electric drive motor, an electric auxiliary pump and a system pressure valve for setting a system pressure, and, in addition to the main pump, the electric auxiliary pump also supplies the hydraulic system with a volume flow of an operating medium to ensure various operating functions, a duration of loading of the electric auxiliary pump is determined in an electronic control unit based on the value of the system pressure and the duration of loading of the electric auxiliary pump is limited by the electronic control unit based on the selected operating function, an input unit is connected to the electronic control unit by a signal line, and the electronic control unit is connected to the system pressure valve by a first control line, and the electronic control unit is connected to the further electric motor, by a second control line, to control a further electric motor, a first pressure line comprises a one-way valve and connects the main pump to the system pressure valve, the one-way valve of the first pressure line prevents the operating medium to flow from the system pressure valve to the main pump, and a second pressure line comprises a one-way valve and connects the electric auxiliary pump to the system pressure valve, the one-way valve of the second pressure line prevents the operating medium to flow from the system pressure valve to the electric auxiliary pump.

14. A hydraulic system of an automatic transmission in a hybrid drivetrain in combination with a device for carrying out a method for operating a hydraulic system of an automatic transmission, in a hybrid drivetrain, the device comprises a main pump powered by at least one of an internal combustion engine and an electric drive motor, an electric auxiliary pump and a system pressure valve for setting a system pressure, and, in addition to the main pump, the electric auxiliary pump also supplies the hydraulic system with a volume flow of an operating medium to ensure various operating functions, a duration of loading of the electric auxiliary pump is determined in an electronic control unit based on a value of the system pressure and the duration of loading of the electric auxiliary pump is limited by the electronic control unit based on a selected operating function, an input unit being connected to the electronic control unit by a signal line, and the electronic control unit being connected to the system pressure valve by a first control line, and the electronic control unit being connected to the further electric motor, by a second control line, to control a further electric motor, a first pressure line comprises a one-way valve and connects the main pump to the system pressure valve, the one-way valve of the first pressure line prevents the operating medium to flow from the system pressure valve to the main pump, and a second pressure line comprises a one-way valve and connects the electric auxiliary pump to the system pressure valve, the one-way valve of the second pressure line prevents the operating medium to flow from the system pressure valve to the electric auxiliary pump.

* * * * *